INVENTOR.
LEVERNE A. KISROW

United States Patent Office 3,396,326
Patented Aug. 6, 1968

3,396,326
VOLTAGE REGULATING CIRCUIT SUPPLYING CURRENT PULSES OF UNIFORM AMPLITUDE AND LENGTH
Le Verne A. Kisrow, Blaine, Minn., assignor to Contemporary Electronic Products Corp., Hopkins, Minn., a corporation of Minnesota
Filed Oct. 22, 1965, Ser. No. 501,156
5 Claims. (Cl. 323—9)

ABSTRACT OF THE DISCLOSURE

A voltage regulator employing a switching transistor interposed between a source of input voltage and output terminals, the transistor being rendered conductive from time to time for periods the lengths of which are relatively constant as long as the input and output voltage remain relatively constant. An inductor and a current sensing resistor are connected in series with the transistor and the transistor is turned off when the current through the resistor reaches a predetermined value. The transistor cannot again become conductive until the decay current of the inductor drops to a predetermined value and the output voltage is below a selected value.

Background of the invention

Numerous devices for regulating voltage and employing electronic switch devices which are turned on and off to produce pulses have been developed. Among the prior devices of this type is one which employs a switching transistor in series with a current sensing resistor and an inductor. When the transistor switch is turned on, the inductor delays the buildup of current to the load device. When the current reaches a predetermined point as measured by the voltage across the current sensing resistor, the transistor switch is turned off. The transistor switch cannot again be turned on until the decaying current through the inductor drops to a predetermined value. It also cannot be turned on again if the output voltage is above a predetermined value. This prior device operated to produce a series of current pulses to the load which were all of the same amplitude and the length of which were constant as long as the input and output voltages remained constant. The varying demands of the load device were taken care of by varying the time between pulses. As the load became greater, the time between pulses became progressively shorter.

Summary of the invention

The present invention is concerned with an improved voltage regulator of the type described above. An object of the invention is to provide a voltage regulator of this type which is simpler in construction, more reliable, and capable of being used to provide a much wider range of output voltages.

In one prior device of this type, a rather involved means is provided for avoiding excessively long periods of conduction of the switching transistors. These switching transistors tend to be damaged if they stay on for excessively long periods of time. The "on" time of the transistor is increased as the differential between the input and output terminals decreases. This is due to the fact that the current through the inductor builds up more slowly if there is a relatively small voltage differential. In the known device, a timer is employed to turn the switching transistor off, regardless of the amount of current sensed by the current sensing resistor, if the switching transistor is on for an excessive period of time. The applicant has found that the same result can be obtained by sensing the input voltage and preventing the electronic switching device from being turned on if the input voltage is not at approximately the normal value. This effectively prevents excessive long "on" times for the transistor.

In the present invention, an improved method for detecting the decay of the current through the inductor is also employed. In the previous apparatus, this was accomplished by measuring a voltage drop across a diode in series with the inductor. This led to various limitations due in part to the limited voltage available across the diode. In the present case, this is done by inductively measuring the rate of current flow through the inductor, producing a voltage which is adequate to the desired control signal.

A still further improvement is that of using a fixed reference voltage in connection with the current sensor. In the prior art type of device, a voltage dependent upon the voltage drop across the current sensor is compared with a voltage derived from the regulated output voltage. As different output voltages are selected, the response of the apparatus to the current sensor is accordingly changed.

Various objects of the invention will become apparent from a consideration of the accompanying specification, claims and drawing of which:

Figures 1, 2:
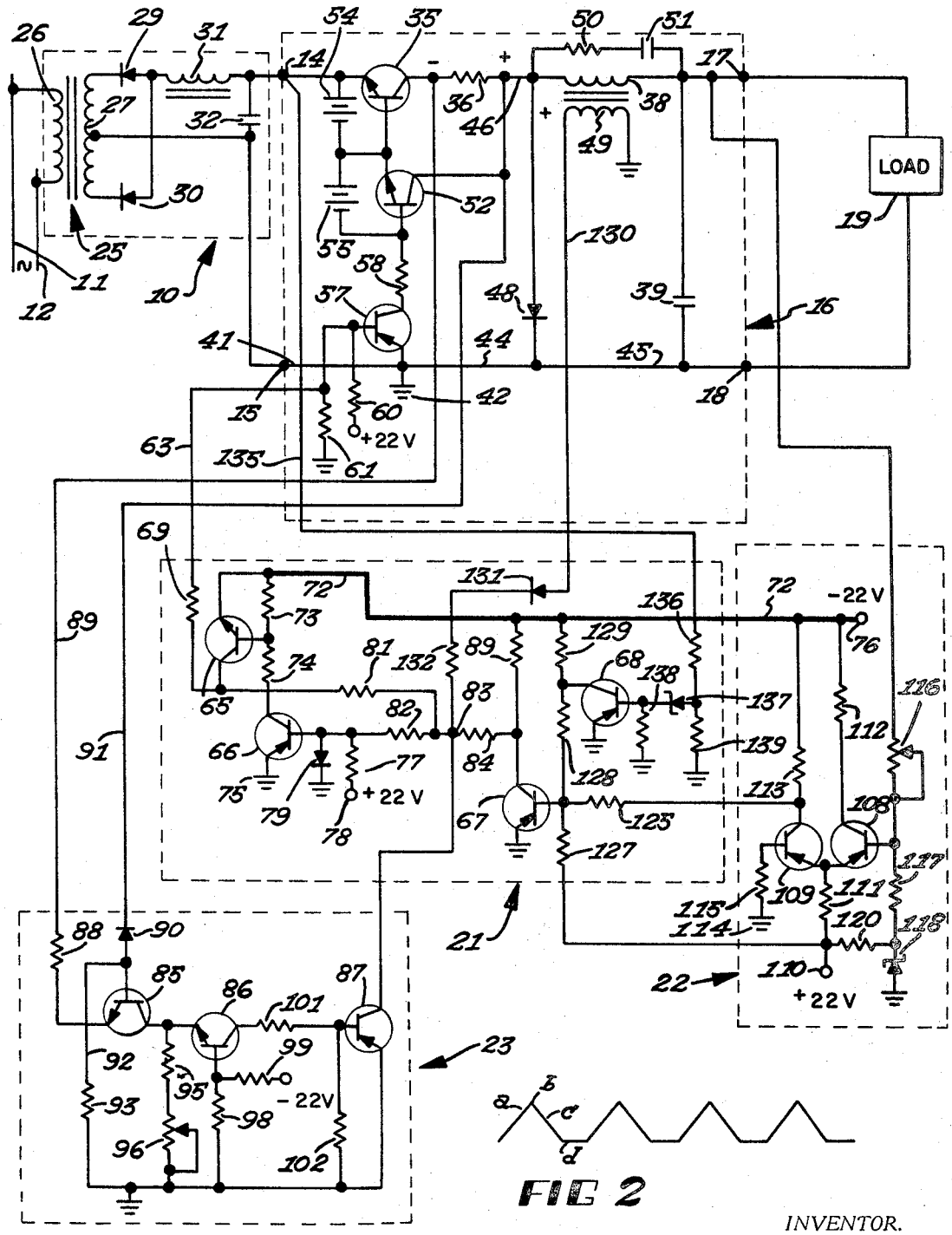
FIGURE 1 is a schematic showing of my voltage regulator.
FIGURE 2 is a representation of the wave form of the current flowing to the capacitor across the output terminals.

Referring to the drawing, I have shown a power converter unit 10 which is designed to be connected to a suitable source of commercial power represented by the leads 11 and 12 leading to any suitable source of alternating current power. The power converter is designed to convert the alternating current power to a direct current voltage somewhat higher than the desired output of the regulator. This voltage is applied to the input terminals 14 and 15 of a power controller unit 16 having output terminals 17 and 18. The output terminals 17 and 18 are connected to a suitable load 19.

Very broadly, the power controller 16 is effective to reduce the voltage appearing across the input terminals 14 and 15 to the desired value at the output terminals 17 and 18 by periodically turning on and off the switching device within the power controller to vary the flow of current to a relatively large capacitor connected across the output terminals 17 and 18. As will be pointed out in more detail, the switching device is controlled in accordance with the current flowing through it, the voltage appearing across the output terminals 17 and 18, and the voltage appearing across the input terminals 14 and 15.

The operation of the switching means is controlled by a switch regulator designated by the reference numeral 21, which in turn is controlled by a voltage comparison unit 22 and a current sensor amplifier 23. The voltage comparison unit 22 serves to determine whether the voltage at the output terminals 17 and 18 is below the desired value or not and to prevent current flow through the switching means when the output voltage is at the selected value. The current sensor 23 responds to the current flowing through the switching means and operates to turn this switching means off when the current reaches a predetermined value.

Referring now to the details of the various units which have generally been referred to above, the power converter unit 10 includes a transformer 25 having a primary winding 26 and a center tapped secondary winding 27. The power converter also comprises a pair of diodes 29 and 30 which are connected between the opposite ends fo the secondary winding 27 and one terminal of a choke coil 31. The opposite terminal of choke coil 31 is connected to one terminal of a capacitor 32, the opposite terminal of which is connected to the center tap of secondary winding 27. The operation of the power converter 10 is entirely conventional and need not be described in detail. The rectifiers 29 and 30 serve to rectify the current on opposite half cycles so as to supply the filter network which consists of inductor 31 and capacitor 32 a full-wave rectified voltage, the ripples of which are substantially removed by the filtering action of inductor 31 and capacitor 32. There thus appears across capacitor 32, a D.C. voltage, the lower terminal of capacitor 32 being positive with respect to the upper terminal. This voltage is connected to input terminals 14 and 15 of the power controller 16.

Turning to the power controller 16, the main switching device of this unit consists of a transistor 35, which is shown as an N-P-N transistor. Connected in series with the collector-emitter path of this transistor is a current sensing resistor 36, which has a voltage thereacross dependent in magnitude upon hte amount of current flowing through the transistor 35. Also connected in series with transistor 35 and resistor 36 is an inductor 38 which in turn is connected to a capacitor 39 connected across the output terminals 17 and 18. It will be seen from above that a circuit may be traced (using the conventional method of tracing circuits from postiive to negative) from the positive input terminal 15 through a conductor 41, which is connected to ground at 42, conductors 44 and 45, capacitor 39, inductor 38, conductor 46, resistor 36, and transistor 35 back to the negative input terminal 14. It will be seen from the above that when the transistor 35 is in its conductive state, charging current can flow through the capacitor 39 causing a voltage to appear across it of such polarity that the lower terminal of capacitor 39 connected to output terminal 18 is posiive and the upper terminal connected to the negative output terminal 17 is negative.

A diode 48 is connected between the left-hand terminal of inductor 38 and the positive terminal of capacitor 39 through conductor 45. In the circuit just traced, while switch 35 is conductive, no current will flow through diode 48 since the diode 48 is poled so as not to conduct current between conductors 44 and 46. When, however, transistor 35 is nonconductive, the energy stored in inductor 38 flows through capacitor 39, through rectifier 48 and capacitor 39, gradually decaying. The amount of current flowing through inductor 38 under these conditions is sensed by a secondary winding 49 which is inductively coupled to the inductor winding 38 so that as long as current is flowing in the inductor winding 38, the winding 49 senses the existence of this current. As will be explained presently, the current induced in winding 49 is used to prevent the transistor 35 from being turned on again until the current through inductor 38 has decayed to a predetermined value. A resistor 50 and capacitor 51 are connected in parallel with inductor 38. These have a relatively high impedance and play no part in the operation except for providing a high impedance bypass to insure that the energy in inductor 38 is completely drained off at the end of each pulse.

Turning back to transistor 35, this transistor is directly controlled by a second transistor 52, also shown as being of the N-P-N type. Transistors 35 and 52 are connected in cascade, the collector-emitter circuit of transistor 52 being connected in series wtih the base-emitter circuit of transistor 35. A bias is maintained between emitter and base of transistor 35 by a suitable source of power shown as the battery 54 and, similarly, a bias is maintained between the emitter and base of transistor 52 by a suitable source of voltage such as the battery 55. In order to maintain an adequate voltage drop between the collector and emitter of transistor 52 to saturate the transistor when it is conductive, the collector of transistor 52 is connected to the positive side of resistor 36 so that the voltage drop appearing across this resistor is added to the base-emitter voltage of transistor 35. Also connected in cascade with transistors 52 and 35 is a third transistor 57, which is shown as a P-N-P transistor. The collector of transistor 57 is connected through a resistor 58 to the base of transistor 52 and the emitter is connected to ground a 42. The base of transistor 57 is connected to the junction of resistors 60 and 61, resistor 60 being connected to a suitable source of voltage positive with respect to ground, for example, +22 volts. Resistor 61 is connected to ground. The base of transistor 57 is thus normally maintained at a voltage positive with respect to ground as determined by the relative magnitudes of resistors 60 and 61 and the source of voltage to which resistor 60 is connected. The base of transistor 57 is also connected to a conductor 63 leading to the switch controller unit 21.

Referring now to the switch controller unit 21, this comprises a plurality of transistors 65, 66, 67 and 68. Transistor 65 is the final transistor stage of a multi-stage transistor amplifier controlled both by the voltage comparison unit 22 and the current sensing amplifier 23. The transistor 65 is shown as an N-P-N transistor and has its emitter-collector circuit connected between the base of transistor 57 and a source of voltage negative with respect to ground. When transistor 65 is conductive, the base of transistor 57 becomes negative with respect to the emitter thereof causing current flow through the emitter-collector circuit of transistor 57 to in turn cause similar action in transistors 52 and 35 cascaded therewith. The collector of transistor 65 is connected through a resistance 69 and conductor 63 to the base of transistor 57. The emitter is connected through a bus conductor 72 connected at 76 to a source of negative potential which may, for example, be at −22 volts. The base of transistor 65 is connected to the junction of the resistor 73 having its upper terminal connected to the negative bus 72 and a resistor 74 connected to the collector of P-N-P transistor 66, the emitter of which is connected to ground at 75. As long as there is no current flowing through the emitter-collector path of transistor 66, the base of transistor 65 is at the same potential as the emitter or may be slightly negative thereto if suitable biasing means are provided. When current flows through the emitter-collector path of transistor 66, however, a voltage drop appears across resistor 73 raising the potential of the base in a positive direction with respect to the emitter and causing base emitter current to flow.

The base of transistor 66 is connected through a resistor 77 to a terminal 78 connected to the source of positive voltage with respect to ground, such as 22 volts. The base is further connected to ground through a diode 79. The collector of transistor 65 is connected through two resistors 81 and 82 to the base of transistor 66. Whenever transistor 65 is conductive, current flows through the emitter-base path of transistor 66, resistors 82 and 81 and through the collector-emitter path of transistor 65 to maintain transistor 66 conductive. Thus resistors 81 and 82 function to provide a feedback action to maintain transistor 66 and hence transistor 65 conductive once they are initiatially rendered conductive.

The base of transistor 66 is biased positively with respect to the emitter so as to normally prevent conduction between the emitter and collector. As previously noted, the base is connected through resistor 77 to a positive source of voltage. Resistors 77 and 82 are connected in series between this positive source of voltage and the negative bus 72 through two further resistors 84 and 89.

The emitter-base current of transistor 66 is controlled by various factors through connections to a common junction point 83 to which is connected the amplified output of the voltage comparison circuit 22, the current sensing amplifier 23 and the secondary winding 49 associated with inductor 38. As will be explained, under some conditions, junction 83 is caused to become sufficiently negative to overcome the positive bias of the base of transistor 66 to cause the transistor to become conductive.

Referring first to the current sensor 23, this comprises N-P-N current transistors 85 and 86 and a P-N-P transistor 87. The emitter of transistor 85 is connected through a resistor 88 and a conductor 89 to the left-hand or negative end of current sensing resistor 36. The base of transistor 85 is connected through a diode 90 and a conductor 91 to the right-hand or positive side of current sensing resistor 36. It will be noted that the diode 90 is poled in such a direction as to oppose any current flow through the base emitter circuit of transistor 85. The diode is, however, forward biased by a connection through conductor 92 and resistor 93 to ground. Thus, because of the forward biasing of diode 90, changes in the voltage drop across resistor 36 can be transmitted to the base of transistor 85, causing current flow between the base and emitter whenever there is a voltage drop across resistor 36. The voltage drop in the forward direction across diode 90 varies in the same manner with temperature as the voltage drop of the base and emitter of transistor 85. Since these voltage drops are equal and opposite, the effect of temperature upon the base emitter current is relatively unaffected by temperature.

The collector of transistor 85 is connected to ground through a fixed resistor 95 and a rheostat 96. As the voltage across resistor 36 increases, current flow increases through the collector-emitter circuit of transistor 85 through rheostat 96 and resistor 95, increasing the potential in a negative direction with respect to ground of the upper terminal of resistor 95. This upper terminal is in turn connected to the emitter of transistor 86, the base of which is connected to a point of fixed potential between two resistors 98 and 99. The outer terminal of resistor 99 is connected to a suitable source of negative voltage such as —22 volts whereas the lower terminal of resistor 98 is connected to ground. It will thus be seen that resistors 98 and 99 form a voltage dividing circuit and that the base of transistor 86 is connected to a point of intermediate potential such as —10 volts. Normally, the emitter of transistor 86 is maintained at a more positive potential than —10 volts but upon transistor 85 becoming conductive to produce a voltage drop across resistor 95 and rheostat 96, as previously mentioned, the emitter potential is made sufficiently more minus than that of the base potential to cause base emitter current to flow to in turn cause collector-emitter current to flow through transistor 86. The collector of transistor 86 is connected through a resistor 101 to the base of transistor 87 and through resistors 101 and 102 to ground. As soon as collector-emitter current flows through transistor 86, current flows through resistor 102 to forward bias the base of transistor 87 to in turn cause current flow from ground through the emitter-collector circuit of transistor 87, junction 83 and resistor 84 and 89 to the negative bus 72 which, as previously mentioned, is maintained at a negative voltage such as —22 volts. The effect of this current flow is to raise the potential of junction 83 in a positive direction to in turn maintain the base of transistor 66 positive with respect to the emitter and hence to prevent current flow between the emitter and collector of the transistor. As has previously been pointed out, it is necessary for emitter-collector flow to take place through transistor 66 for the main switching transistor 35 to be conductive. Hence, whenever the current flow through current sensing resistor 36 reaches a point where transistor 85 is rendered conductive, the resultant effect upon the potential of junction 83 is to cause transistor 66 to become nonconductive to in turn cause the main switching transistor 35 to be nonconductive, thus terminating flow of current to the inductor 38.

Turning now to the voltage comparator circuit 22, this circuit is in the form of a differential amplifier having two P-N-P transistors 108 and 109 whose emitter-collector circuits are both connected between a positive source of potential at terminal 110 and the negative bus 72. The two emitters of transistors 108 and 109 are connected together and through a resistor 111 to the positive junction 110. The collector of transistor 108 is connected through a resistor 112 to the negative bus 72 and the collector of transistor 109 is connected through a smaller resistor 113 to the negative bus 72. The base of transistor 109 is connected to ground at 114 through a resistor 115. The base is thus normally at a lower potential than the emitter so as to cause emitter-base current to flow and cause the transistor 109 to be conductive.

The base of transistor 108 is connected to a voltage divider consisting of a rheostat 116 and a resistor 117 connected between the upper negative output terminal 17 and a point of fixed potential determined by a Zener diode 118. It will be noted that a circuit can be traced from the terminal 110 maintained at a positive potential through a resistor 120 and the Zener diode 118. Thus, the upper terminal of Zener diode 118 is held at a fixed positive potential which may, for example, be +10 volts. The rheostat 116 and resistor 117 are thus connected between this fixed point of positive potential and the negative output terminal 17. The rheostat 116 is adjusted in accordance with the desired output voltage. When the output voltage is below the desired value, that is, when the terminal 17 is less negative with respect to ground than desired, the base of transistor 108 is positive with respect to the emitter to prevent current flow through transistor 108. This will result in transistor 109 being conducted as has just been referred to. This will cause current to flow through resistor 113 to cause a substantial voltage drop through resistor 113 and maintain the lower end at ground potential. The lower end of resistor 113 is connected through a resistor 125 to the base of transistor 67. The base of transistor 67 is connected between resistor 127 connected to the positive source of power at terminal 110 and resistors 128 and 129 connected to the negative bus 72. When current is flowing through resistor 113 as a result of transistor 109 being conductive, the base of transistor 67 is held positive with respect to the grounded emitter thereof. Otherwise, as will be pointed out, the base is negative with respect to the emitter to cause current flow therethrough.

Assuming the conditions just being considered which exist when the voltage between the output terminals 17 and 18 is less than that desired, transistor 67 is nonconductive. Assuming no other effects present on junction 83, the effect of this is to cause junction 83 to become slightly negative to render transistor 66 conductive which in turn, as previously pointed out, causes switch 35 to be conductive.

Going back to the operation of the voltage comparator circuit 22, when the voltage differential between output terminals 17 and 18 increases beyond the desired voltage, the junction point between rheostat 116 and resistor 117 becomes more negative with the result that the base of transistor 108 becomes negative with respect to the emitter to cause current flow through the emitter-collector circuit of transistor 108. This, in turn, causes transistor 109 to become nonconductive which will cause transistor 67 to be made conductive, in the absence of other factors, and to make transistor 66 nonconductive thereby preventing the switch 35 from becoming conductive. The action of this will be described in more detail later under the heading "Operation."

The voltage at junction point 83 is controlled also by the current flowing through secondary winding 49 coupled to the inductor 38. The right-hand terminal of this inductor is grounded and the left-hand terminal is connected through a conductor 130, and a diode 131 and a resistor 132 to the junction point 83. When the current through inductor coil 38 is rising with the switch being closed, the left-hand terminal of secondary 49 is negative with respect to the right-hand terminal and due to the direction in which diode 131 is connected in the circuit, this negative voltage is not impressed through the connection just traced on junction point 83. When, however, the current through inductor 38 is decreasing, a voltage is produced across secondary winding 49, the polarity being such that the left-hand terminal of secondary 49 is positive with respect to ground. A positive potential is applied through conductor 130, diode 131 and resistor 132 to junction 83 to hold this point positive sufficiently to maintain the base of transistor 66 positive with respect to ground. Thus as long as an appreciable current is flowing through inductor 38 as the current decays, the base of transistor 66 is held in a positive condition with respect to the emitters so that no current can flow, thus insuring that switch 35 cannot be re-energized until the current through inductor 38 has dropped to a predetermined value.

I also provide means for insuring that switch 35 cannot be turned on until the input voltage reaches a predetermined value close to the normal input voltage. As will be pointed out later, when switch 35 is turned on, the current through the inductor builds up at a rate proportional to the differential between the input and output voltages. If the input voltage is abnormally low, the current through switch 35 and inductor 38 will build up very slowly resulting in a long period of time before the current through resistor 36 reaches a value sufficient to turn off transistor 35. This will result in an excessively long "on time" for transistor 35, which may result in damage to the transistor.

To guard against this, I provide the transistor 68 previously referred to and a voltage sensing network. Connected in series between the negative input terminal 14 and ground are a conductor 135 and resistors 136 and 139. Connected between the junction of resistors 136 and 139 are a Zener diode 137 and a resistor 138. The junction of Zener diode 137 and resistor 138 is connected to the base of transistor 68, the emitter of which is connected to ground and the collector of which is connected to the junction of resistors 128 and 129. The effect of connecting Zener diode 137 and resistor 138 in parallel with resistor 139 is to apply to the series combination of the Zener diode 137 and resistor 138 that portion of the total voltage across the input terminals which appears across resistor 139. A constant voltage drop appears across Zener diode 137 and a variable voltage drop across resistor 138, this latter voltage drop being applied between the base and emitter of transistor 68. The constants are so selected that when the input voltage is below the desired value, transistor 68 is nonconductive and the base of transistor 67 is maintained at a sufficiently negative voltage to maintain transistor 67 conductive, due to the relative values of resistors 127, 128 and 129 which constitute a voltage divider as previously explained. When, however, the input voltage is at the desired value, the base of transistor 68 is sufficiently negative to cause conduction between the emitter and collector thereof. This raises the potential of the junction of resistors 128 and 129 and hence the base of transistor 67 sufficiently high that transistor 67 ceases to conduct unless caused to do so by the voltage comparison circuit 22.

Operation

Let it be assumed that the apparatus is first being turned on by being connected to the source of power designated by the wires 11 and 12. Under these conditions, the output voltage is less than the desired value so that transistor 108 of the voltage comparison circuit is nonconductive and transistor 109 is conductive. The effect of the latter is to bring the potential of the junction of resistor 113 and the collector of transistor 109 to ground potential. This tends to make the base of transistor 67 positive to cause it to be nonconductive to in turn make transistors 66, 65, 57 and 35 conductive.

If the input voltage is at the desired value, the drop across resistor 138 will be sufficiently high to cause the base of transistor 68 to be sufficiently negative to cause conduction of transistor 68 thereby raising in a positive direction the potential at the junction of resistors 128 and 129 and hence the potential at base 67 sufficiently to cause nonconduction of transistor 67. As just mentioned, the voltage comparison network 122 is also tending to cause nonconduction of transistor 67 under these conditions. Under these circumstances, transistor 67 is nonconductive and, as previously explained, this causes, in the absence of a signal from current sensing network 23, transistors 66, 65, 57, 52 and 35 to be conductive.

Under these conditions, current can flow from input terminal 15 through conductors 41, 44, 45, capacitor 39, inductor 38, conductor 46, current sensing resistor 36, and the main switching transistor 35 back to the other input terminal. Due to the effect of inductor 38, the current through capacitor 39 will slowly rise as indicated by the line a of FIGURE 2. When the current has reached the value indicated by the point b of FIGURE 2, the voltage drop across resistor 36 will have increased to the point where the current through the transistor 85 is sufficiently high. This in turn causes the emitter of transistor 86 to become more negative to cause current flow between the base and emitter of transistor 86 and hence between the collector and emitter of the transistor. This in turn forward biases the base of transistor 87 with respect to the emitter to cause current to flow from ground through emitter of transistor 87 and resistor 84 and 89 to the negative bus conductor 72. This, as previously explained, causes the base of transistor 66 to become more positive so as to cut off transistor 66. This in turn causes transistor 65 to become nonconductive and as previously explained, to turn off transistors 57, 52 and 35, thus terminating the flow of current through the circuit just traced.

At the time switch 35 opens, there is energy stored in the inductor 38. Current now flows through inductor 38, rectifier 43 and capacitor 39, this current slowly falling as the energy in inductor 38 decays. The curve during this portion of the cycle is indicated by the line c in FIGURE 2. The decrease in current flowing through inductor 38 causes a voltage to be induced in the secondary 49, the polarity of which is such that the left-hand terminal of secondary 49 is positive with respect to the right-hand or grounded terminal. This voltage is transmitted through rectifier 131 and resistor 132 to junction 83 so as to maintain the base of transistor 66 positive with respect to the emitter. Thus, it is assured that regardless of any other voltages supplied to the base of transistor 66, this transistor will be maintained nonconductive to in turn maintain switch 35 nonconductive during the time that current is decaying through inductor 38. Thus, switch 35 is maintained off until the current flow drops to the value indicated by the base line d.

The diode 79 connected between the base and emitter of transistor 66 is provided for protective purposes to avoid too high a voltage being applied between the base and emitter of transistor 66. Because of diode 79, it is impossible to apply to the base of transistor 66 a positive voltage greater than the forward drop through diode 79. Hence, regardless of the magnitude of the voltage across secondary 49, it is impossible to apply an excessive positive voltage to the base of transistor 66.

The slope of lines $a$ and $c$ is constant for any selected output voltage, once the output voltage has reached approximately its desired value. During the portion of the curve represented by line $a$, the current builds up in accordance with the relation $di/dt = el/L$ where $el$ is the difference in voltage between the input and output terminals. Once the output voltage has reached approximately its desired value, it will be apparent that $di/dt$ is determined by two constants, one the difference voltage and the difference voltage and the other the inductance of winding 38. When the switch 35 is turned off, the current will decay in accordance with the equation $di/dt = -V_2/L$ where $-V_2$ is the output voltage less the voltage drop across diode 48. Again, both of these values are relatively constant so that the rate of current decay will be constant. Thus, since point $b$ is fixed by the value of resistor 36 and the various circuit components associated with transistors 85 and 86, the length of the wave bounded by lines $a$ and $c$ will be constant. Thus, the length of each pulse is always the same for any given difference voltage and output voltage regardless of load current.

During the initial charging of capacitor 39, as soon as the current through secondary 49 has decayed sufficiently to remove the positive voltage from the base of transistor 66, this transistor can again conduct. As soon as switching transistor 35 was turned off, the voltage across transistor 85 dropped to zero so that the current sensing amplifier no longer applies a voltage to junction 83. Hence, as soon as the current through inductor 38 as measured by the secondary winding 49 has dropped to the desired minimum value, indicated by line $d$, the switch 35 is again turned on and the cycle just described is repeated. While I have shown in FIGURE 2 a space between the wave forms, during the initial charging of the capacitor 39, a second wave form immediately follows the first. After a series of such pulses, the voltage across capacitor 39 and hence across output terminals 17 and 18 reaches the desired value. When this happens, the base of transistor 108 becomes sufficiently negative to turn on transistor 108, as previously described. This in turn results in transistor 109 being turned off to turn on transistor 67 by making the base thereof more negative. This would result in transistors 66, 65, 57, 52 and 35 being turned off, if it were not for the effect of resistors 84 and the feedback effect of resistors 81 and 82 thus, during the rising portion of a wave form, the output voltage responsive means has no effect, so that any particular wave of current will be completed. The attainment of the desired voltage, however, prevents the switch 35 from again being turned on until the output voltage drops below the desired value, thus turning off transistor 108.

After the capacitor has once come up to its full voltage, a series of wave forms such as shown in FIGURE 2 will take place. The length of the line $d$ will be dependent upon the amount of current drawn by load 19. If no current is being drawn by the load, the wave forms will be widely spaced from each other. Each wave form, however, will be of uniform length. As more and more current is drawn, the particular waves represented by lines $a$ and $c$ will occur more frequently so as to maintain the desired voltage.

The magnitude of the output voltage and the length of the wave form for a given voltage differential can both be adjusted. The rheostat 116 connected in series with resistor 117 across the output terminals varies the portion of the voltage drop appearing between the base and emitter of transistor 108 and hence varies the output voltage at which transistor 108 becomes conductive. Thus, by suitable adjustment of the rheostat 116, any given output voltage over a very wide range may be selected.

The rheostat 96 associated with transistors 85 and 86 varies the amount of current at which transistor 86 will become conductive and hence vary the point $b$ in the curve of FIGURE 2. By suitable adjustment of rheostat 96, the current waves may be shorter or longer, and since the point $b$ is varied, the maximum average current that can be delivered to the load is varied.

Thus, by simple adjustments, the output voltage and the maximum output current can be readily adjusted.

With the present apparatus, the measurement of the decay current through inductor 38 is very accurate inasmuch as this is done through the inductively coupled winding 49 rather than through a diode in series with the inductor 38. What it is important to do is to determine as accurately as possible when the current has dropped to the level "$d$." By using the inductor 49 which measures current, rather than a voltage based upon current and impedance, this is much more accurately done with the present apparatus.

It will furthermore be noted that with my apparatus, it is unnecessary to provide any timer for limiting the length of the "on" time of transistor 35. The need for this is eliminated in my device by preventing transistor 35 from becoming conductive if the input voltage is appreciably below the desired value. By doing this, it is assured that the difference between the input and output voltage can never be abnormally low so as to cause an excessive "on" time for the transistor 35.

It will also be noted that with my circuit, a resistor 99 is connected to a fixed source of voltage to provide a reference voltage for determining when the voltage across current resistor 36 is sufficiently high that transistor 35 should be cut off. It has been previously proposed to employ a voltage derived from the output voltage for this purpose. By using a fixed voltage, independent of the output voltage, it is possible to make wide adjustments in the output voltage without affecting the operation of the current sensor.

*Values of components*

While the invention is in no way limited to the employment of any particular values of components, I have found it desirable in one particular embodiment of my invention to employ the following components:

Resistors:

| | | |
|---|---|---|
| 36 | ohms | .05 |
| 58 | do | 50 |
| 73 | kilohms | 5.1 |
| 74 | do | 1.8 |
| 60 | do | 2.7 |
| 61 | ohms | 1 |
| 69 | ohms | 510 |
| 84 | kilohms | 7.5 |
| 88 | ohms | 120 |
| 89 | kilohms | 13 |
| 93 | do | 22 |
| 95 | do | 1 |
| 96 | do | 5 |
| 98 | do | 1.8 |
| 99 | do | 2 |
| 101 | do | 1.2 |
| 102 | do | 5.1 |
| 111 | do | 22 |
| 112 | do | 10 |
| 113 | do | 30 |
| 116 | do | 2 |
| 120 | do | 560 |
| 125 | do | 36 |
| 127 | do | 220 |
| 128 | do | 75 |
| 129 | do | 22 |
| 132 | do | 2 |
| 136 | do | 5.1 |
| 138 | do | 3 |
| 139 | do | 3.6 |
| 77 | do | 47 |
| 81 | do | 15 |
| 82 | do | 6.8 |

Diodes:

| | |
|---|---|
| 48 | 1N249RC |
| 79 | 50E3 |
| 90 | 50E3 |
| 118 | 1N2163 |
| 131 | 1N837A |
| 137 | 1N4740 |

Transistors:

| | |
|---|---|
| 35 | 2N3773 |
| 52 | DTS423 |
| 57 | 2N3790 |
| 65 | 2N3643 |
| 66 | 2N3638 |
| 67 | 2N3638 |
| 68 | 2N3638 |
| 85 | 2N3568 |
| 86 | 2N3567 |
| 87 | 2N3638A |
| 108 | 2N3638 |
| 109 | 2N3638 |

Inductor 38 _____ microhenries __ 175
Capacitor 39 _____ mfd __ 100,000

It is to be understood that the above values are merely illustrative and are in no way to be taken as limiting the scope of the invention. It is desirable, however, that transistors with high switching speeds, such as those named above, be employed to reduce the losses as much as possible.

*Conclusion*

It will be seen that I have provided a voltage regulator circuit which is capable of regulating very accurately a selected output voltage. The voltage regulator is capable of being used over a wide range of output voltages, the sole requirement being that the input voltage be higher than the output voltage. Furthermore, regardless of the amount of current drawn, the pulse width is always constant for any given set of input and output voltages. Because of the use of transistors with high switching speeds the voltage regulation is performed at very high efficiency.

Because of the fact that the apparatus cannot be operated unless the input voltage is substantially at the desired value, it is assured without the use of elaborate timing devices that the switching transistor will not be on for an excessive period of time.

While I have shown a specific embodiment of my invention, it is to be understood that this is for purposes of illustration only and that the scope of my invention is limited solely by the appended claims.

I claim as my invention:

1. A voltage regulator circuit having:
   output terminals adapted to be connected to a load requiring a selected constant voltage thereacross;
   input terminals adapted to be connected to a source of voltage of greater magnitude than the selected output voltage;
   a switching device connected between said input and output terminals, said switching device having conductive and nonconductive conditions and having its current carrying capacity limited by the lengths of time it is in its conductive condition;
   an inductive reactance in series with said switching device to retard the current flow to said load;
   an impedance in series with said switching device for producing a voltage drop thereacross dependent upon the magnitude of the current flowing through said switching device to said output terminals;
   means for permitting decay of the energy stored in said inductive reactance when said switching means assumes said nonconductive condition; and
   control means for causing said switching device to assume its conductive condition for time periods the length of which vary inversely with the differential between the voltages across the input and output terminals, to produce a series of current pulses normally of constant length and of constant magnitude, said control means including
      first means responsive to said voltage drop to cause said switching device to remain in said conductive condition until said voltage drop reaches a predetermined amplitude and then to assume a nonconductive condition to cause said current pulses to be of a magnitude determined by the voltage drop across said impedance,
      second means including an element inductively coupled with said inductive reactance and effective each time that said switching device is rendered nonconductive to prevent said switching device from again becoming conductive until the decaying current in said reactance drops to a predetermined value measured by said element inductively coupled to said reactance, and
      a third means responsive to the voltage across said output terminals to pervent said switching device from again becoming conductive whenever the voltage across said output terminals is above the selected value.

2. The voltage regulator of claim 1 in which there is means associated with said voltage responsive means for varying the selected output voltage over a relatively wide range.

3. The voltage regulator of claim 2 in which the first means of said control means includes a circuit for comparing the voltage drop across said impedance with a source of voltage of constant magnitude independent of the output voltage which is selected.

4. The voltage regulator of claim 2 in which the control means further includes circuit means connected to the input terminals and effective when the source of voltage is appreciably below its normal value to prevent said switching device from assuming its conductive condition.

5. A voltage regulator having:
   output terminals adapted to be connected to a load requiring a selected constant voltage thereacross;
   input terminals adapted to be connected to a source of voltage of greater magnitude than the selected output voltage;
   a switching device connected between said input and output terminals, said switching device having conductive and nonconductive conditions and having its current carrying capacity limited by the lengths of time it is in its conductive condition;
   an inductive reactance in series with said switching device to retard the current flow to said load;
   an impedance in series with said switching device for producing a voltage drop thereacross dependent upon the magnitude of the current flowing through said switching device to said output terminals;
   means for permitting decay of the energy stored in said inductive reactance when said switching means assumes said nonconductive condition; and
   control means for causing said switching device to assume its conductive condition for time periods the length of which vary inversely with the differential between the voltages across the input and output terminals, to produce a series of current pulses normally of constant length and of constant magnitude, said control means including
      first means responsive to said voltage drop to cause said switching device to remain in said conductive condition until said voltage drop reaches a predetermined amplitude and then to assume a nonconductive condition to cause said current pulses to be of a magnitude determined by the voltage drop across said impedance,
      second means coupled with said inductive reactance and effective each time that said switching device is rendered nonconductive to prevent said switching device from again becoming conductive until the decaying current in said reactance drops to a predetermined value, a third means responsive to the voltage across said input terminals to prevent said switching device from again becoming conductive whenever the voltage across said output terminal is above the selected value, and a fourth means connected to said input terminals effective to prevent said switching device assuming its conductive state when the source of voltage is appreciably below its normal value.

References Cited

UNITED STATES PATENTS

| | | | |
|---|---|---|---|
| 3,040,183 | 6/1962 | Farnsworth | 323—22 X |
| 3,122,697 | 2/1964 | Kauders | 317—22 X |
| 3,264,550 | 8/1966 | Paice | 323—9 |
| 3,284,692 | 11/1966 | Gautherin | 323—22 X |
| 3,290,583 | 12/1966 | Sinclair | 323—9 |
| 3,303,414 | 2/1967 | Jensen | 323—9 |
| 3,304,489 | 2/1967 | Brolin et al. | 323—9 |

LEE T. HIX, *Primary Examiner.*

A. D. PELLINEN, *Assistant Examiner.*